United States Patent

Graff et al.

[11] 4,342,553
[45] Aug. 3, 1982

[54] GLASS TO NICKEL-IRON ALLOY SEAL

[75] Inventors: William A. Graff, Willoughby; George L. Thomas, Chesterland, both of Ohio

[73] Assignee: General Electric Company, Schenectady, N.Y.

[21] Appl. No.: 306,824

[22] Filed: Sep. 29, 1981

Related U.S. Application Data

[63] Continuation-in-part of Ser. No. 192,915, Oct. 1, 1980, abandoned.

[51] Int. Cl.³ .............. C03C 3/08; C03C 7/02; F21K 5/02
[52] U.S. Cl. .................. 431/358; 156/325; 428/433; 431/362; 501/15; 501/21; 501/25; 501/56; 501/59; 501/66
[58] Field of Search .......... 431/358, 362, 361; 156/325; 428/433; 501/15, 21, 25, 56, 59, 66

[56] References Cited

U.S. PATENT DOCUMENTS

| | | | |
|---|---|---|---|
| 2,392,314 | 1/1946 | Dalton | 501/66 X |
| 3,114,863 | 12/1963 | Dalton et al. | 501/66 X |
| 3,506,385 | 4/1970 | Weber et al. | 431/362 |
| 3,832,124 | 8/1974 | Loughridge et al. | 431/361 X |
| 4,038,020 | 7/1977 | Audesse et al. | 431/361 X |

FOREIGN PATENT DOCUMENTS 55-109243  8/1980  Japan ................ 501/21

OTHER PUBLICATIONS

Volf, M. B.–Technical Glasses (1961), London, Sir Isaac Pitman & Sons, Ltd., pp. 72–73, 290–291, 312–314, 345–349.

*Primary Examiner*—Helen M. McCarthy
*Attorney, Agent, or Firm*—John F. McDevitt; Philip L. Schlamp; Fred Jacob

[57] ABSTRACT

A range of borosilicate glass compositions which are capable of sealing effectively to nickel iron alloys containing up to approximately 52% nickel to form a hermetic seal resistant to thermal shock breakage. The glass is in the composition range percent by weight of:
$SiO_2$: 55–66
$Al_2O_3$: 4.5–10
$Na_2O$: 0–4
$K_2O$: 3.5–7
$B_2O_3$: 19.0–26.0
$TiO_2$: 0–4

6 Claims, 2 Drawing Figures

GLASS TO NICKEL-IRON ALLOY SEAL

This application is a continuation-in-part of application Ser. No. 192,915, abandoned, filed Oct. 1, 1980, in the names of the present inventors.

BACKGROUND OF THE INVENTION

This invention relates generally to borosilicate glass compositions particularly suitable for sealing to nickel iron metal alloys to provide a direct hermetic seal exhibiting thermal endurance. More particularly, the present glass compositions can be reliably sealed directly to commercial nickel iron alloys now being used as the lead-in conductors for electric lamps wherein the resulting hermetic seal will be subjected to severe thermal shock conditions when the lamp is operated. All glass type flash lamps fit into this product category by reason of requiring a transparent glass envelope which is hermetically sealed directly to a pair of inlead conductors since the flash lamps change temperature rapidly from room temperature to near the glass softening point in a few milliseconds when ignited.

Kovar metal alloys have been used for some time to provide glass-to-metal seals in flash lamps because of particular thermal expansion characteristics which can create compression in seals of said metal alloys to glass. The general range of composition for said Kovar alloys is about 27-32% nickel, 14-19% cobalt, less than 1% manganese, an the balance iron by weight except for incidental impurities. A known borosilicate glass found to be especially suitable for this type glass-to-metal seal is disclosed in U.S. Pat. No. 3,506,385 assigned to the present assignee. The composition of this known glass is in the range by weight percent: 60-75 $SiO_2$, 10-25 $B_2O_3$, 1-10 $Al_2O_3$, 4-10% total alkali oxides and 0-5% BaO except for incidental impurities, residual fluxes and refining agents with said glass composition exhibiting a mean coefficient of linear thermal expansion between 0° and 300° C. in the range $40-50 \times 10^{-7}$ per °C. While a commercial nickel iron alloy is known which contains around 42% nickel and exhibits a thermal expansion characteristic similar to said Kovar metal alloys, it has not been found possible to reliably seal inleads of said nickel iron alloy with the prior art glass composition during lamp manufacture. The glass-to-metal seals produced in this manner have exhibited high stress levels leading to unsatisfactory containment of the flash lamp reaction and breakage of the lamps from thermal shock.

Other thermal expansion characteristics for nickel iron alloys containing about 40-45 weight percent nickel as compared with Kovar-type alloys require that modified borosilicate glass composition be found for the glass-to-metal seals if subjected thereafter to significant thermal shock conditions. Specifically, these nickel iron alloys undergo greater thermal expansion above 350° C. than is experienced by the Kovar-type alloy although exhibiting a thermal expansion coefficient in the 0°-350° C. range of about $45-56 \times 10^{-7}$ per °C. which closely approximates that for the Kovar alloy. By lowering the transformation temperature of the prior art glass composition, however, plastic flow in the glass could begin at a lower temperature to relieve the physical stress caused by thermal shock. It is an object of the present invention, therefore, to provide a superior borosilicate glass for direct sealing to the nickel iron alloys above defined having improved thermal shock resistance.

SUMMARY OF THE INVENTION

It has been discovered, surprisingly, that a particular combination of the oxide constituents in the known borosilicate glass composition provides a transformation temperature for the modified glass no greater than about 425° C. along with a thermal expansion curve at lower temperatures essentially matching that for the nickel iron alloy. Specifically, the present glass composition consists essentially of, in weight percent:

$SiO_2$: 55-66
$Al_2O_3$: 4.5-10
$Na_2O$: 0-4
$K_2O$: 3.5-7.0
$B_2O_3$: 19.0-26.0
$TiO_2$: 0-4 except for incidental impurities, residual fluxes and refining agents, with an average linear coefficient thermal expansion in the 0°-350° C. temperature range between about $45-56 \times 10^{-7}$ per °C. and a transformation temperature no greater than about 425° C. This glass further exhibits a higher rate of thermal expansion at temperatures above the transformation point along with good chemical stability at the glass-to-metal interface once the glass has been sealed directly to the nickel iron alloy in a conventional manner. Melting and drawing of the present glass as well as the optical transmission has proven fully equivalent to the prior art glass composition so that flash lamps constructed therefrom retain the same improved performance disclosed in the aforementioned U.S. Pat. No. 3,506,385.

Varying the oxide proportions in the present glass understandably modifies the desired performance. An $Al_2O_3$ content less than approximately 4.5% by weight elevates the glass transformation temperature above 425° C. which is undesirable for sealing to the nickel iron alloy while greater than approximately 10% of said oxide content produces a glass too viscous and inhomogenous for conventional melting. Undesirable phase separation also occurs during glass melting with higher $Al_2O_3$ contents than specified. A $B_2O_3$ content below 19% in the glass reduces thermal expansion unduly while raising this oxide content above 26% produces both inhomogeneity and difficulty in working during the melting process. Increasing either alkali metal oxide in the glass above the maximum amount specified elevates the thermal expansion excessively as well as the transformation temperature. In the preferred glass compositions, the ratio of $K_2O$ to $Na_2O$ by weight is maintained at 1 or greater due to the greater relative effect of $Na_2O$ in elevating both thermal expansion and transformation temperature. Further optional incorporation of $TiO_2$ in the present glass can beneficially lower the transformation temperature; with a 1% content of said oxide lowering the transformation temperature by 6°-7° C. Another benefit attributable to $TiO_2$ in the present glass is a homogenizing effect during the melting process. Above 2% $TiO_2$ content, however, there is some lowering of the optical transmission which can adversely influence usage as a lamp glass envelope material.

Suitable nickel-iron alloys serving as the inlead material in the present improved flash lamps can be selected from commercially available alloys containing about 27-52% nickel by weight. The preferred alloy materials contain approximately 40-45% nickel by weight and the carbon content is kept below approximately 0-0.10% by weight to avoid gas bubble formation when the hermetic seal is produced. An especially preferred alloy product is sold by Carpenter Technology Corporation as "Glass Sealing 42" alloy which is reported to contain in percentages by weight: C=0.10, Mn=0.50, Si=0.25, Ni=42.0 and the balance iron. Said commercial alloy is further reported to exhibit a mean coefficient of thermal expansion in the 21.1°–343° C. range of $54 \times 10^{-7}$ per °C. with an inflection point at 343° C. Heat treatment of said commercial alloy product in a reducing atmosphere has been found beneficial in further lowering the carbon content for more reliable glass-to-metal seal formation.

DESCRIPTION OF THE PREFERRED EMBODIMENTS

Figure 1:
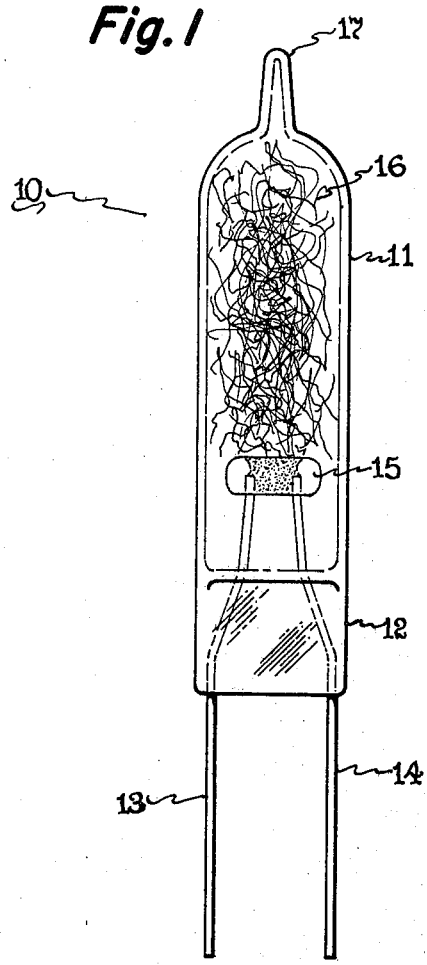
FIG. 1 is a cross-sectional view partly in elevation, of a high voltage type flash lamp incorporating the glass envelope material of the present invention.

As shown in FIG. 1, a preferred flash lamp construction incorporating the present improvement can have the same structural features disclosed in issued U.S. Pat. No. 4,128,858 which is also assigned to the present assignee. Said lamp construction 10 is of the all-glass type for actuation by a high voltage pulse causing ignition to produce a high intensity flash of actinic light. The light flash is attributable to a combustion-supporting gas such as oxygen being contained within a hermetically sealed glass envelope together with a loosely distributed filling of suitable light producing combustible material such as shredded foil of zirconium, aluminum or hafnium for example. In typical high voltage flash lamp constructions of this type, a fulminating type primer material is employed as a mass electrically connected directly across and between a pair of inlead wires extending into the lamp envelope. The primer material may be positioned and carried in the lamp on the top of a glass or ceramic insulating material through which the inlead wires extend or may be carried in the cavity provided in this member. Ignition of said primer material responsive to said high voltage pulse desirably provides a sufficient blast that the inleads remain spaced apart in an open circuit condition. Known primer materials for such lamp constructions also desirably produce either a non-conductive or conductive residue upon combustion which can provide a subsequent function when a plurality of said flash lamps are electrically connected by circuitry to fire in a predetermined sequence.

Accordingly, said above defined flash lamp 10 comprises a tubular envelope 11 formed with the present modified borosilicate glass and having a stem pressed seal 12 at one end thereof through which a pair of nickel iron inlead wires 13 and 14 extend from the exterior to the interior of the bulb 11 in a generally mutually parallel spaced apart manner to form part of a ceramic mount member 15. The bulb 11 is partially filled above the mount 15 with a loose mass of filamentary or shredded metal foil or wire 16 of zirconium of hafnium or other suitable combustible metal. Air is exhausted from the bulb 11 and the bulb is thereafter filled with oxygen under pressure of at least several atmospheres such as about 5 to 10 atmospheres or greater, after which the bulb is sealed off at an exhaust tip 17 located at the outer end thereof from the stem pressed seal 12. Said lamp may be coated with the usual lacquer or plastic protective coating which contains the photoflash reaction if the glass envelope shatters from thermal shock when ignited.

Figure 2:
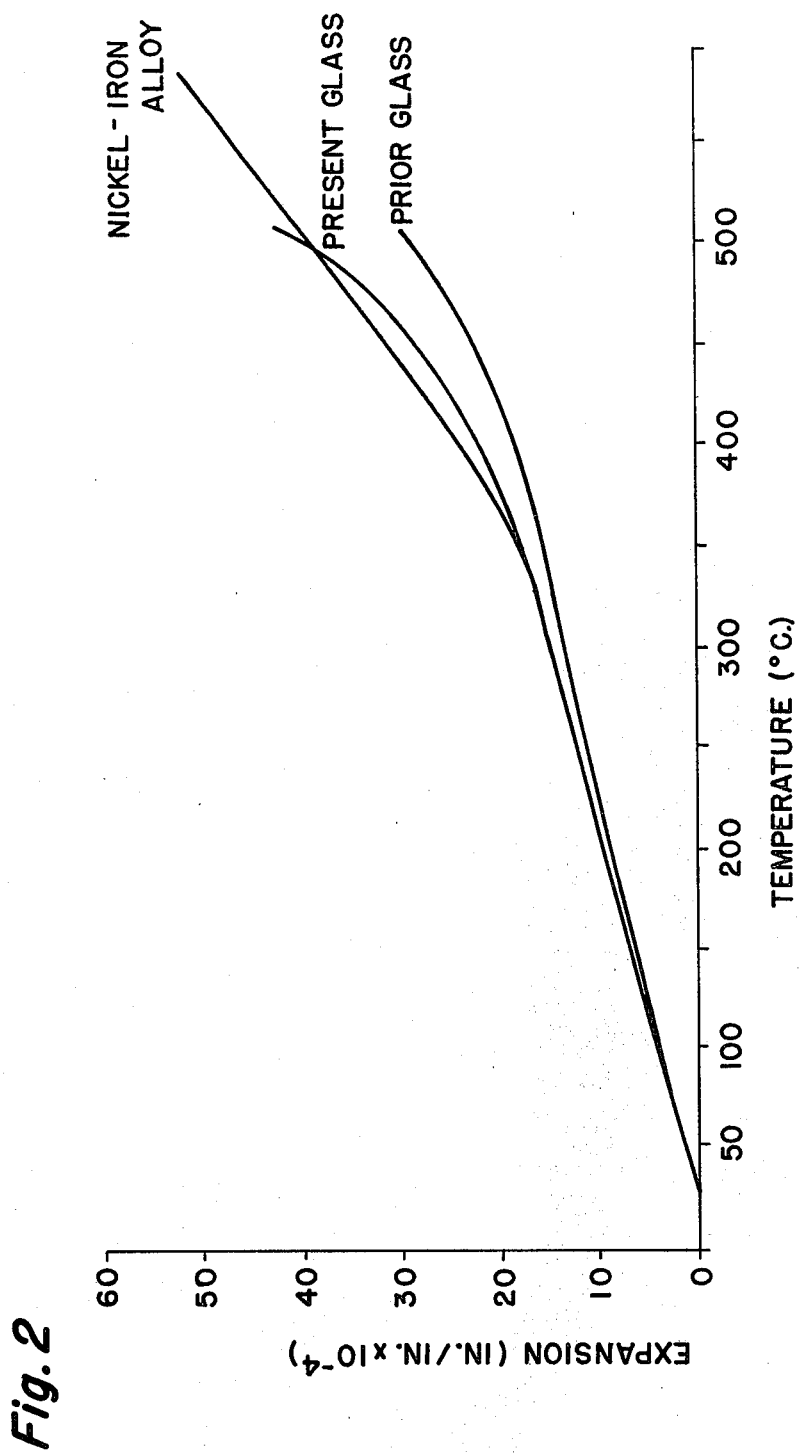
FIG. 2 is a graph illustrating thermal expansion behavior in said lamp construction.

The improved thermal expansion behavior in the above described flash lamp is depicted graphically in FIG. 2. As shown in said graph, a thermal expansion curve for the nickel iron alloy is depicted along with thermal expansion curves for the present glass and the prior art borosilicate glass disclosed in the aforementioned U.S. Pat. No. 3,506,385. The inflection point occurs at around 350° C. in the nickel iron alloy curve so that a glass material sealed directly thereto should have a transformation temperature in the same temperature region to avoid creating a high stress level in the glass-to-metal seal when heated during lamp operation. The present glass material is shown to exhibit a close match in thermal expansion with said nickel iron alloy in the 0°–350° C. temperature region as distinct from the lower expansion for the prior art borosilicate glass. More importantly, the transformation temperature occurs no higher than 425° C. in the present glass while this does not occur in the prior art glass until higher temperatures have been reached. Of added further significance in the same regard is a greater thermal expansion for the present glass above the transformation temperature as compared with the prior art glass since greater stress relief in the glass-to-metal seal is thereby achieved.

Preferred glasses according to the present invention are reported in Table I below. The present glass material can be drawn into tubing by conventional methods from the glass melting furnace where melting and homogenizing takes place. Melting and homogeneity of said glass material both become more difficult as the alumina content is increased within the hereinbefore range specified. On the other hand, $TiO_2$ incorporation in said glass material up to the maximum level also hereinbefore specified improves homogeneity and workability of the glass but produces a slight yellow coloration decreasing visible transmission in the 350–450 namometer region of the visible spectrum. Such addition of $TiO_2$ in the present glass material also lowers the strain point for an improved thermal expansion match with the particular nickel-iron alloy used in providing direct hermetic seals according to the present inventions. Utilization of the present glass material to provide the transparent envelope for the previously described lamp embodiment in FIG. 1 thereby enables direct hermetic sealing between said glass material and inleads of said particular nickel-iron alloy.

TABLE I

| Weight Percent | 1 | 2 | 3 | 4 |
|---|---|---|---|---|
| $SiO_2$ | 59.4 | 62.1 | 61.7 | 64.9 |
| $Al_2O_3$ | 9.4 | 7.0 | 6.8 | 4.7 |
| $Na_2O$ | 3.2 | 3.0 | 3.1 | 3.1 |
| $K_2O$ | 5.1 | 5.2 | 5.0 | 4.9 |
| $B_2O_3$ | 22.3 | 22.1 | 21.8 | 21.8 |
| Cl | 0.2 | 0.2 | 0.2 | 0.1 |
| F | 0.4 | 0.4 | 0.4 | 0.5 |
| $TiO_2$ | — | — | 1.0 | — |
| Strain Pt (°C.) | 429 | 426 | 419 | 425 |
| Thermal Expansion Coefficient (0–300° C.) | 55.4 | 52.8 | 52.3 | 49.4 |
| Anneal Pt (°C.) | 463 | 466 | 460 | 471 |
| Transformation Pt (°C.) | 414 | 418 | 413 | 421 |

It will be apparent from the foregoing description that an improved borosilicate glass has been provided which is especially useful in electric lamps subject to thermal shock. Minor modifications in the present glass composition are contemplated, however, such as by incorporation of up to 0.5% of various refining agents or various substitute oxides in other minor amounts which do not materially alter either the transformation temperature or thermal expansion. For example, the especially preferred glass composition illustrated in Example 2 above comprises in percent by weight; $SiO_2$ 62.1, $Al_2O_3$ 7.0, $Na_2O$ 3.0, $K_2O$ 5.2, $B_2O_3$ 22.1, Cl 0.2 and F 0.4. It is intended, therefore, to limit the present invention only by the scope of the following claims.

What we claim as new and desire to secure by Letters Patent of the United States is:

1. A glass to metal hermetic seal directly between a nickel-iron metal alloy containing approximately 27–52 weight percent nickel and the balance iron except for minor amounts of other alloying elements and a glass composition which consists essentially of, in weight percent:
$SiO_2$: 55–66
$Al_2O_3$: 4.5–10
$Na_2O$: 0–4
$K_2O$: 3.5–7
$B_2O_3$: 19–26
$TiO_2$: 0–4
except for incidental impurities, residual fluxes and refining agents, having an average linear coefficient of thermal expansion in the 0°–350° C. temperature range between about 45 to $56 \times 10^{-7}$ per °C. and a transformation temperature no greater than about 425° C.

2. A glass to metal hermetic seal as in claim 1 wherein said glass composition consists essentially of, in weight percent:
$SiO_2$: 62.1
$Al_2O_3$: 7.0
$Na_2O$: 3.0
$K_2O$: 5.2
$B_2O_3$: 22.1
Cl: 0.2
F: 0.4
except for incidental impurities, residual fluxes and refining agents.

3. A glass to metal hermetic seal as in claim 1 wherein said metal alloy has an inflection point in its thermal expansion curve at around 350° C.

4. In a photoflash lamp comprising a transparent glass envelope, filamentary combustible material within said glass envelope and inlead wires extending into said glass envelope, the improvements which comprise having the glass envelope formed with a glass composition which consists essentially of, in weight percent:
$SiO_2$: 55–66
$Al_2O_3$: 4.5–10
$Na_2O$: 0–4
$K_2O$: 3.5–7
$B_2O_3$: 19–26
$TiO_2$: 0–4
except for incidental impurities, residual fluxes and refining agents, having an average linear coefficient of thermal expansion in the 0°–350° C. temperature range between about 45 to $56 \times 10^{-7}$ per °C. and a transformation temperature no greater than about 425° C., having the inlead wires formed with a nickel-iron alloy containing approximately 27–52 weight percent nickel and the balance iron except for minor amounts of other alloying elements, and having a direct hermetic seal between said glass envelope and said inlead wires.

5. An improved photoflash lamp as in claim 4 wherein said glass composition consists essentially of, in weight percent:
$SiO_2$: 62.1
$Al_2O_3$: 7.0
$Na_2O$: 3.0
$K_2O$: 5.2
$B_2O_3$: 22.1
Cl: 0.2
F: 0.4
except for incidental impurities, residual fluxes and refining agents.

6. An improved photoflash lamp as in claim 4 wherein said metal alloy has an inflection point in its thermal expansion curve at around 350° C.

* * * * *